(12) United States Patent
Kitai et al.

(10) Patent No.: US 6,403,204 B1
(45) Date of Patent: Jun. 11, 2002

(54) OXIDE PHOSPHOR ELECTROLUMINESCENT LAMINATE

(75) Inventors: Adrian Kitai, Mississauga; Kenneth Cook, Waterloo, both of (CA)

(73) Assignee: Guard, Inc., Guelph (CA)

( * ) Notice: Subject to any disclaimer, the term of this patent is extended or adjusted under 35 U.S.C. 154(b) by 0 days.

(21) Appl. No.: 09/511,729

(22) Filed: Feb. 23, 2000

Related U.S. Application Data (60) Provisional application No. 60/121,431, filed on Feb. 23, 1999.

(51) Int. Cl.$^7$ ................................................ H05B 33/22
(52) U.S. Cl. ..................... 428/212; 428/690; 428/917; 428/701; 428/702; 428/336; 313/503; 313/509
(58) Field of Search ................................ 428/690, 917, 428/701, 702, 212, 336; 313/509, 503

(56) References Cited

U.S. PATENT DOCUMENTS

| | | | |
|---|---|---|---|
| 4,857,802 A | | 8/1989 | Fuyama et al. |
| 4,897,319 A | | 1/1990 | Sun |
| 5,496,597 A | * | 3/1996 | Soininen et al. ............ 427/584 |
| 5,714,274 A | | 2/1998 | Sugiura et al. |
| 5,725,801 A | | 3/1998 | Kitai et al. |
| 5,788,882 A | | 8/1998 | Kitai et al. |
| 5,897,812 A | | 4/1999 | Kitai et al. |

* cited by examiner

*Primary Examiner*—Cynthia H. Kelly
*Assistant Examiner*—Ling Xu
(74) *Attorney, Agent, or Firm*—Hill & Schumacher; Lynn C. Schumacher (57) ABSTRACT

Electroluminescent laminates having a thin film electroluminescent oxide phosphor layer on insulating substrates. Thin film EL laminates are produced using high dielectric constant layers, such as $SrTiO_3$ and $BaTiO_3$ next to the oxide phosphor layer on one or both sides of the oxide layer, primarily as stable charge injection, and trapping interface layers, and to increase the electric field in the phosphor. Electric breakdown protection through self-healing has been provided by traditional low K dielectrics in combination with an appropriate choice of adjacent electrode. The high dielectric constant materials employed also provide for a high capacitance layer, thereby increasing the electric field in the phosphor and increasing the charge transfer into the phosphor during emission. These thin film EL laminates demonstrate steep brightness-voltage behavior and have been prepared using green and red electroluminescent oxide phosphors.

39 Claims, 5 Drawing Sheets

OXIDE PHOSPHOR ELECTROLUMINESCENT LAMINATE

CROSS REFERENCE TO RELATED U.S. PATENT APPLICATION

This patent application relates to U.S. Provisional patent application, Ser. No. 60/121,431, filed on Feb. 23, 1999, entitled THIN FILM ELECTROLUMINESCENT OXIDE PHOSPHOR DEVICES WITH GLASS SUBSTRATES.

FIELD OF THE INVENTION

The present invention relates to electroluminescent laminates that include a thin film electroluminescent oxide phosphor layer.

BACKGROUND OF THE INVENTION

Thin film electroluminescent (TFEL) devices typically include a laminate or laminar stack of thin films deposited on an insulating substrate. The thin films include a transparent electrode layer and an electroluminescent (EL) phosphor structure, comprising an EL phosphor material sandwiched between a pair of insulating layers. A second electrode layer completes the laminate structure. In matrixed addressed TFEL panels the front and rear electrodes form orthogonal arrays of rows and columns to which voltages are applied by electronic drivers, and light is emitted by the EL phosphor in the overlap area between the rows and columns when sufficient voltage is applied in excess of a voltage threshold.

In designing an EL device, a number of different requirements have to be satisfied by the laminate layers and the interfaces between these layers. To enhance electroluminescent performance, the dielectric constants of the insulator layers should be high. To work reliably however, self-healing operation is desired, in which electric breakdown is limited to a small localized area of the EL device: The electrode material covering the dielectric layer fails at the local area, preventing further breakdown. Only certain dielectric and electrode combinations have this self-healing characteristic. At the interface between the phosphor and insulator layers, compatibility between materials is required to promote charge injection and charge trapping, and to prevent the interdiffusion of atomic species under the influence of the high electric fields during operation.

Standard EL thin film insulators, such as $SiO_2$, $Si_3N_4$, $Al_2O_3$, $SiO_xN_y$, $SiAlO_xN_y$ and $Ta_2O_5$ typically have relative dielectric constants (K) in the range of 3 to 60 which we shall refer to as low K dielectrics. These dielectrics do not exhibit the properties required to work well in layers adjacent to oxide phosphors, which have high threshold electric fields. A second class of dielectrics, called high K dielectrics, hold more potential. This class includes materials such as $SrTiO_3$, $BaTiO_3$, $PbTiO_3$ which have relative dielectric constants in the range of 100 to 10,000, and are crystalline with the perovskite structure. While all of these dielectrics exhibit a sufficiently high figure of merit (defined as the product of the breakdown electric field and the relative dielectric constant) to function in the presence of high electric fields, not all of these materials offer sufficient chemical stability and compatibility in the presence of high processing temperatures and/or high electric fields. $SrTiO_3$, $BaTiO_3$, exhibit the required properties to provide good performance in an EL device, when positioned adjacent to oxide phosphors.

In view of the multiple and often conflicting requirements placed on the insulating layers and their interfaces, multi-component insulator structures have been proposed. Also, it is known in the art that $SrTiO_3$, $BaTiO_3$ can be used in EL devices. For example, U.S. Pat. No. 4,857,802 to Fuyama discusses the use of $SrTiO_3$ and $BaTiO_3$ insulating layers. However, this teaches how to grow the pervoskite structure dielectrics in a [111] orientation to improve its breakdown strength, and only discusses application with sulfide phosphors. The compatibility issues with oxide phosphors, and the incorporation of self-healing breakdown functionality is not addressed.

U.S. Pat. No. 4,547,703 to Fujita teaches the use of a multi-layer insulator comprised of non-self healing dielectric layers combined with self healing dielectric layers. In this case, a self-healing, low K dielectric is adjacent to the sulfide phosphor, and the primary rationale for including the non-self-healing dielectric in the EL device was to increase the capacitance of the insulating layer, thereby increasing the electric field in the phosphor and increasing the charge transfer into the phosphor during emission. The rationale did not include providing electrical and chemical compatibility with the phosphor.

U.S. Pat. No. 4,897,319 to Sun teaches the use of a multi-layered insulator in an EL device. However, in Sun's devices, no high K dielectrics are employed, and he teaches that it is essential to have a SiON layer (a low K dielectric) adjacent to the sulfide phosphor.

Thus, two component insulators have been proposed in which a low dielectric constant material maintains the charge trapping and injection at the interface with the phosphor, and a high dielectric constant material layer increases the electric field in the phosphor. A high dielectric constant layer increases the field in the phosphor, and a low dielectric constant layer interfaces with an electrode to promote self-healing electrical breakdown.

The teachings of the prior art on TFEL structures are based on the use of doped zinc sulfide as the EL phosphor layer. It would be very advantageous to provide a TFEL device that uses electroluminescent oxides instead of sulphides since the former are less sensitive to atmospheric water vapor and oxygen and so minimal sealing is required in manufacturing the display. Since the interface characteristics between the insulator layer and the phosphor are important in designing a successful EL structure, prior art is not particularly helpful in developing a TFEL stack which uses unrelated material formulations as the EL phosphor layer. While $SrTiO_3$ and $BaTiO_3$ exhibit desirable interface and charge injection properties with oxide phosphors, they also exhibit propagating breakdown mode in thin films.

Therefore, it would be very advantageous to provide thin film electroluminescent structures which use oxide based electroluminescent phosphors and which provide a self-healing breakdown mode of operation. A more electrically robust dielectric layer with a high figure of merit is required adjacent to the phosphor to provide proper electron trapping and charge injection in the presence of high electric fields. At the same time, the material must not react with the phosphor during high temperature processes in manufacture, nor allow chemical reaction or inter-diffusion of chemical species between the phosphor or the adjacent layer in the presence of these high electric fields. Because both bulk and surface properties are important, this is known as the dielectric interface layer.

SUMMARY OF THE INVENTION

It is an object of the present invention to develop thin film EL device structures that include the oxide phosphors.

To achieve this objective, thin film $SrTiO_3$ and $BaTiO_3$ have been employed next to the oxide phosphor layer (on one or both sides of the oxide layer), primarily as stable charge injection, and trapping interface layers, and to increase the electric field in the phosphor. Electric breakdown protection through self-healing has been provided by traditional low K dielectrics in combination with an appropriate choice of adjacent electrode. The high dielectric constant materials employed also provide for a high capacitance layer, thereby increasing the electric field in the phosphor and increasing the charge transfer into the phosphor during emission.

In one aspect of the invention there is provided an electroluminescent laminate, comprising;

an electrically insulating substrate;

a conducting metal oxide layer on a surface of the substrate;

an electroluminescent oxide phosphor layer on the conducting layer;

a first dielectric interface layer on the oxide phosphor layer;

a first dielectric layer on the first dielectric interface layer, the first dielectric interface layer having a dielectric constant higher than a dielectric constant of the first dielectric layer; and a second conducting layer on the first dielectric layer, and wherein at least one of the conducting layer and the conducting metal oxide layer is substantially transparent, and wherein when only the conducting metal oxide layer is substantially transparent the substrate is also transparent. In this aspect of the invention the first dielectric layer and the second conducting layer are characterized by self-healing properties.

In another aspect of the invention there is provided an electroluminescent laminate, comprising;

an electrically insulating substrate;

a first conducting layer on a surface of the substrate;

a first dielectric interface layer on the first conducting layer;

an oxide phosphor layer on the first dielectric interface layer;

a second dielectric interface layer on the oxide phosphor layer;

a first dielectric layer on the second dielectric interface layer;

the first and second dielectric interface layers each having a dielectric constant greater than a dielectric constant of the first dielectric layer; and a second conducting layer on the first dielectric layer, and wherein at least one of the two conducting layers is substantially transparent, and wherein when only said first conducting layer is substantially transparent said substrate is also transparent.

In this aspect of the invention the first dielectric layer and the second conducting layer are characterized by self-healing properties.

BRIEF DESCRIPTION OF THE DRAWINGS

The invention will now be described, by way of example only, reference being had to the accompanying drawings, in which:

FIG. 2 is a cross sectional view of a TFEL device based on the structure of FIG. 1a;

DETAILED DESCRIPTION OF THE INVENTION

The inventors have shown for the first time that thin film dielectrics may be used to form bright EL laminate devices using oxide phosphors. These oxide phosphors require different properties from the layers adjacent to the phosphor than do the traditional EL sulfide-based phosphors. Oxide phosphors require higher electric fields than do traditional EL phosphors based on sulfides. These high operating fields, combined with the higher processing temperatures of oxide phosphors (600°–800° C.) and the fact that these oxide phosphors have a different fundamental chemical composition compared to sulfides create some challenges to overcome when making an oxide-phosphor based EL device.

Being all thin-film in nature, the devices produced according to the present invention demonstrate steep brightness-voltage behavior and have been prepared on glass, and fused silica substrates. A variety of common substrates can be used including glass, fused silica, ceramic glass and glazed or polished ceramic.

Corning 1737 substrates, coated by a commercial supplier Applied Films Inc. with a conducting bottom electrode layer comprising indium tin oxide (ITO) to a thickness of ~1500 Å by RF sputtering are coated with a series of dielectric, EL and top electrode layers. Non-limiting examples will be given hereinafter of devices formed on glass and their behavior to illustrate the structure and resulting performance available. All layers are grown by RF sputter deposition except for the aluminum rear electrode which is thermally evaporated.

Figure 1A:
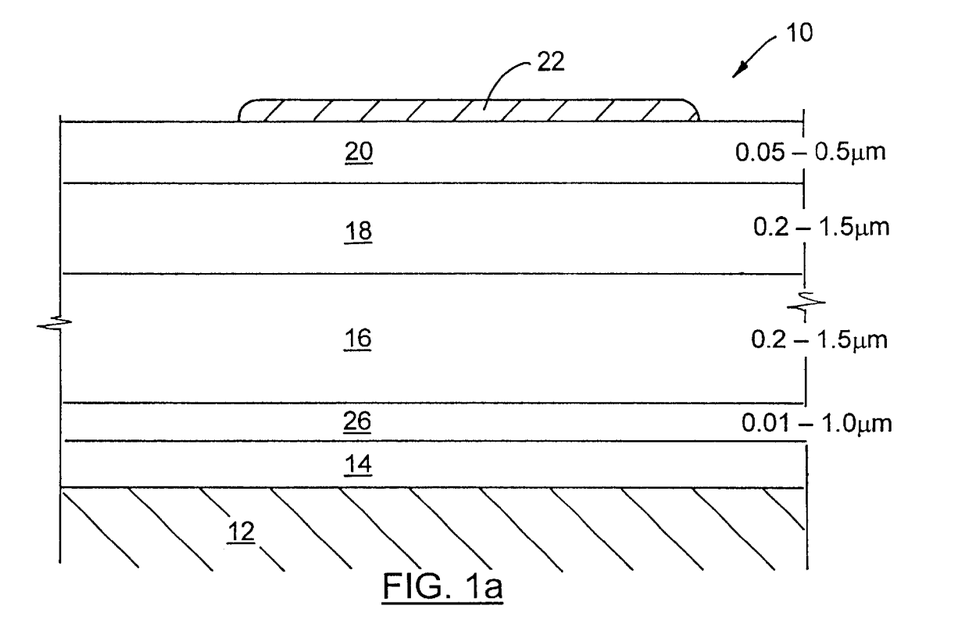
FIG. 1a is a cross sectional view of a first embodiment of a structure of a thin film electroluminescent (TFEL) device constructed in accordance with the present invention.

Referring first to FIG. 1a, a structure of a TFEL device shown generally at 10 includes a substrate 12 onto which a conducting electrode 14 is deposited. A high dielectric constant interface layer 26 is deposited on the electrode 14. An oxide phosphor layer 16 is sandwiched between the dielectric interface layer 26 and another dielectric interface layer 18. Another dielectric layer 20 is located on top of dielectric interface layer 18. Dielectric interface layers 18 and 26 are high K materials. An electronically conducting electrode 22 is located on top of dielectric layer 20 to form a self-healing structure. The preferred thickness ranges for each of the layers comprising the TFEL structure 10 is shown to the right of the corresponding layer in FIG. 1a. One or both of the electrodes is transparent. If only the lower electrode is transparent, the substrate is also transparent.

Preferred low dielectric materials for use in the present invention include thin film dielectrics, such as $SiO_2$, $Si_3N_4$, $Al_2O_3$, $SiO_xN_y$, $SiAlO_xN_y$ and $Ta_2O_5$ that have relative dielectric constants K in the range of 3 to 60. These dielectrics do not exhibit the properties required to work well in layers adjacent to oxide phosphors. A second class of dielectrics having higher dielectric constants and functioning as both a dielectric and a charge injection layer is located directly on the oxide phosphor layer. These dielectrics include materials such as $SrTiO_3$ and $BaTiO_3$ which have relative dielectric constants in the range of 100 to 5,000, and are crystalline with the perovskite structure.

Figure 1B:
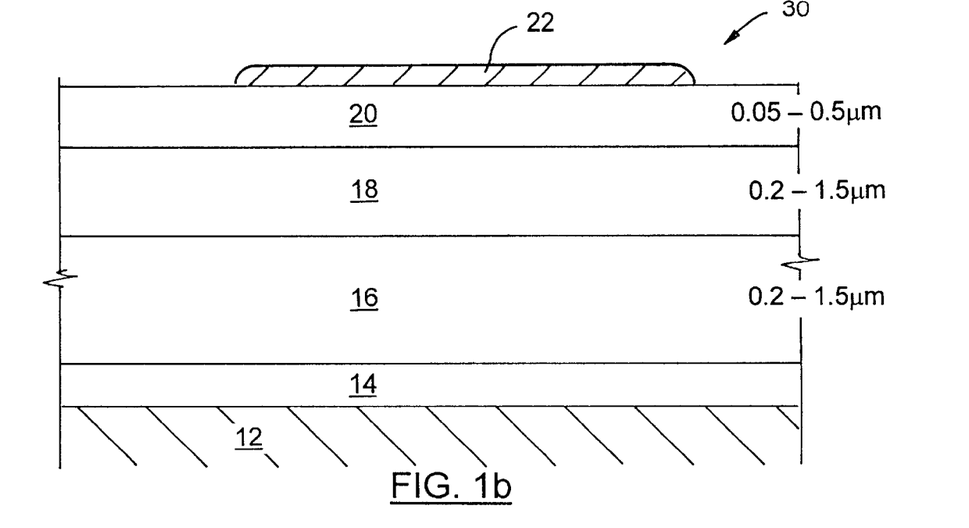
FIG. 1b is a cross sectional view of an alternative embodiment of a structure of a TFEL device.

An alternative embodiment of a structure of a TFEL device is shown at 30 in FIG. 1b. TFEL structure 30 is similar to structure 10 in FIG. 1a but the dielectric interface layer 26 is removed. While this embodiment does not have a dielectric interface layer between the phosphor and an electrode, certain electrode materials (such as ITO and ZnO) do provide the characteristics necessary for a functioning TFEL device. The preferred thickness ranges for each of the layers comprising the TFEL 30 structure is shown to the right of the corresponding layer in FIG. 1b.

Figure 1C:
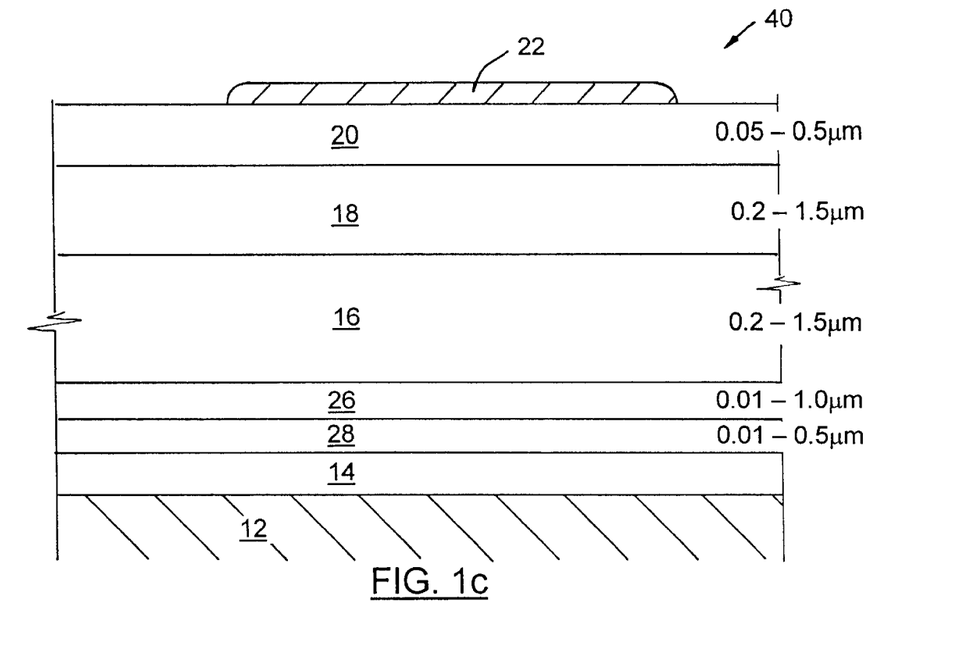
FIG. 1c is a cross sectional view of another alternative embodiment of a structure of a TFEL device.

Another alternative embodiment of a structure of a TFEL device is shown at 40 in FIG. 1c. TFEL structure 40 is similar to structure 10 in FIG. 1a but additionally includes a low dielectric constant layer 28 interposed between lower electrode 14 and the dielectric interface layer 26. The preferred thickness ranges for each of the layers comprising the TFEL structure 40 is shown to the right of the corresponding layer in FIG. 1c.

Figure 2:
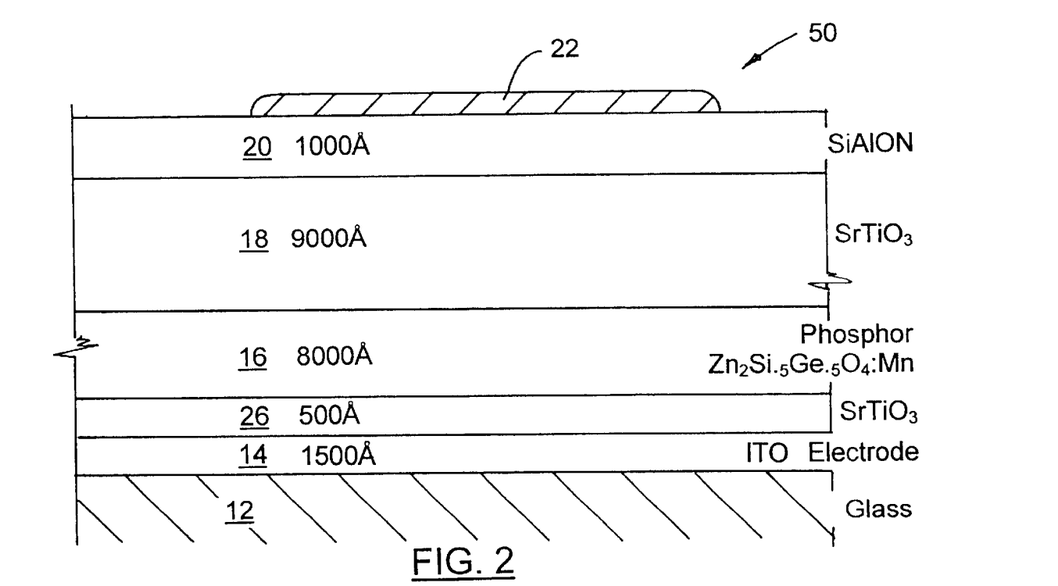

A TFEL device based on the laminate structure of FIG. 1a is shown at 50 in FIG. 2. Corning type 1737 glass was used as a substrate 12. The glass substrate 12 was 1.1 mm thick and was coated with an electronically conducting bottom electrode 14 comprising indium tin oxide (ITO) deposited by RF magnetron sputtering to a thickness of approximately 1500 Å by Applied Films Inc. Next, a $SrTiO_3$ layer was sputtered by RF sputtering from a $SrTiO_3$ target to form a 500 Å thick dielectric interface layer 26 on top of the electrode layer 14. The substrate temperature was held at 550° C. An oxide thin film EL phosphor layer 16 was then sputter deposited from an oxide target comprising $Zn_2Si_{0.5}Ge_{0.5}O_4$:Mn by RF magnetron sputtering. The substrate temperature was held at 250° C. and the EL film thickness was about 8000 Å. The laminate was baked at 700° C. for 1 hour in vacuum to activate and crystallize the phosphor layer 16. Next, $SrTiO_3$ was sputtered by RF sputtering from a $SrTiO_3$ target to form a 9000 Å thick dielectric interface layer 18 on top of the EL oxide phosphor. The substrate temperature was held at 550° C. The dielectric SiAlON layer 20 was then sputter deposited to a thickness of 1000 Å with the substrate held at 100° C. Finally, an aluminum electrode 22 was thermally evaporated to a thickness of 700 Å on top of the SiAlON.

Figure 3:
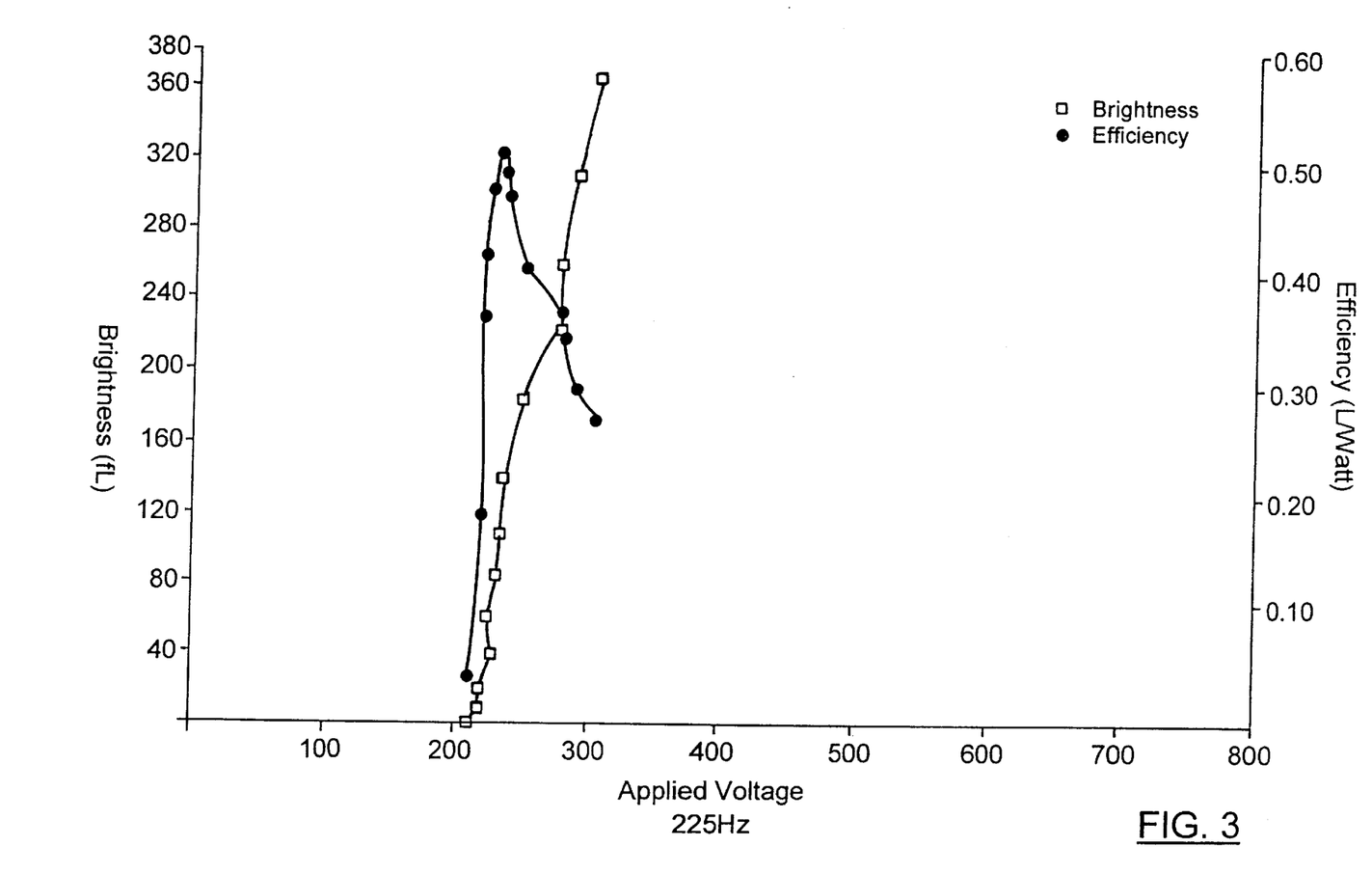
FIG. 3 is a graph showing both brightness and efficiency versus voltage of electroluminescence obtained from the device of FIG. 2.

The performance of the TFEL device of FIG. 2 is illustrated in FIG. 3. AC pulses were applied to the device at a frequency of 225 Hz. The threshold voltage is 210 volts and the brightness reaches 185 fL at a voltage of 250 volts. The maximum efficiency is above 0.5 I/W.

Figure 4:
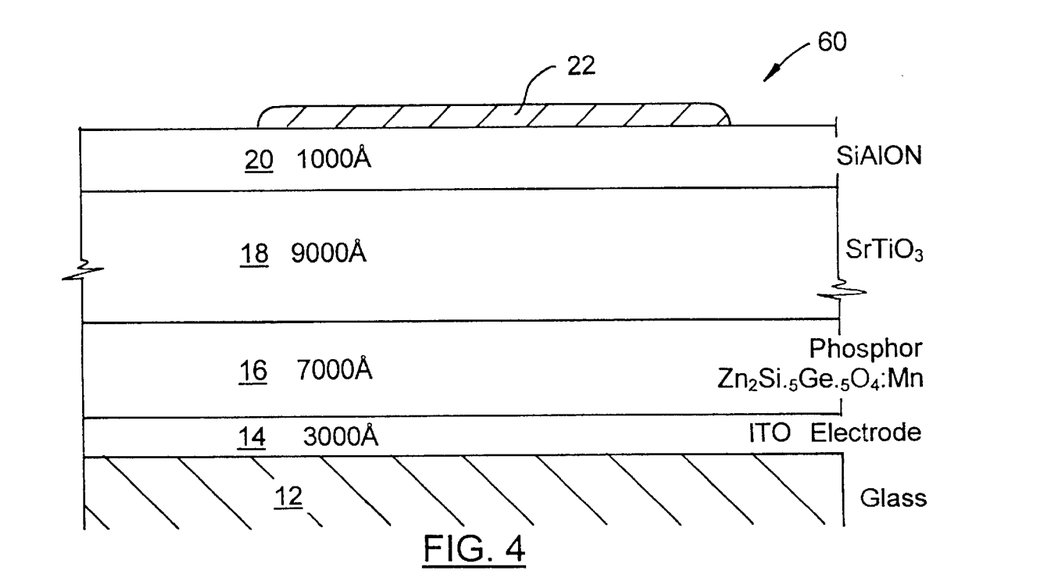
FIG. 4 is a cross sectional view of a TFEL device based on the structure of FIG. 1b.
Figure 5:
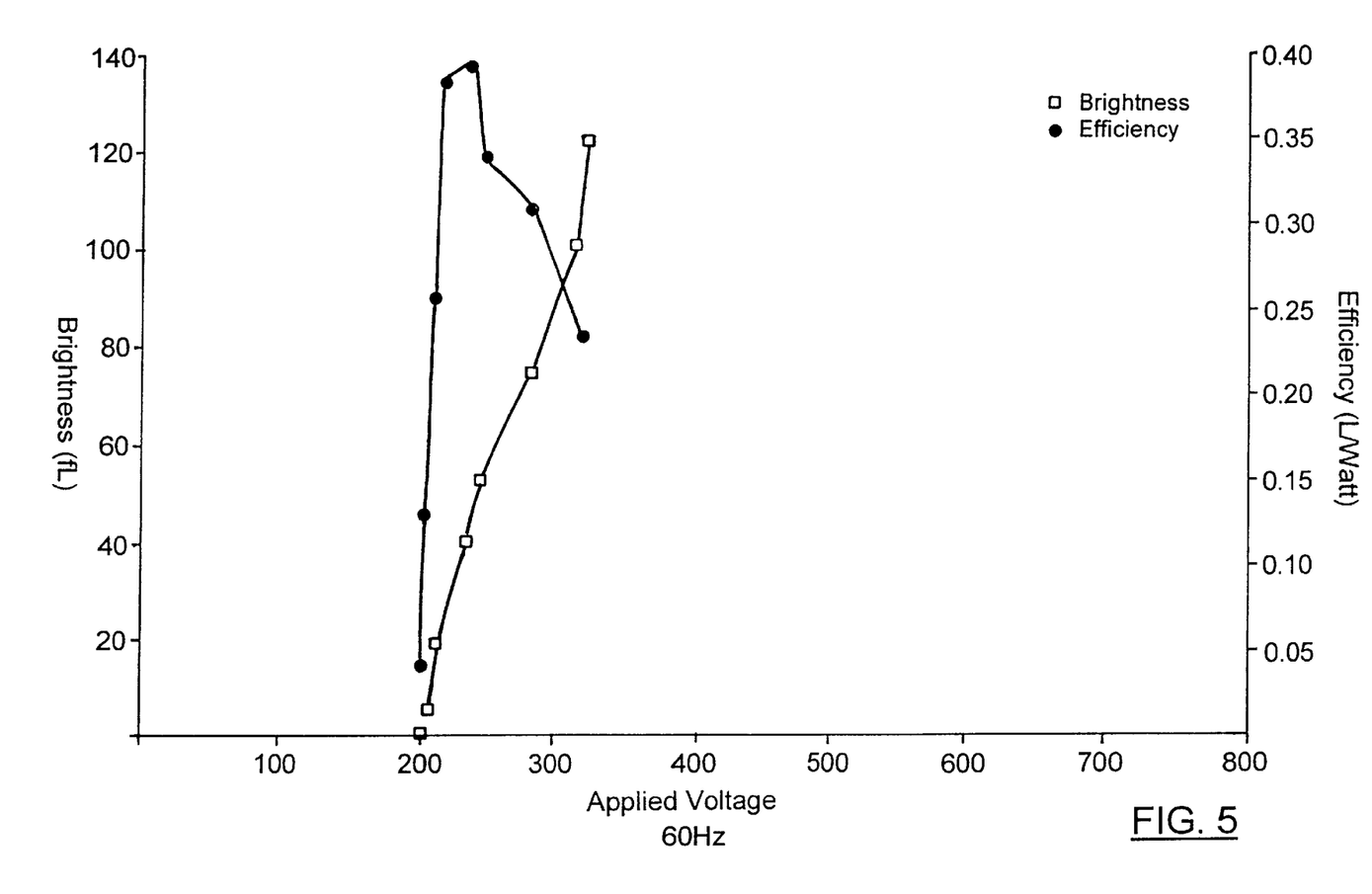
FIG. 5 is a graph showing both brightness and efficiency versus voltage of electroluminescence obtained from the device of FIG. 4.

Another type of layer that exhibits the required properties for good EL performance when positioned adjacent to the oxide phosphors is a conducting oxide such as indium tin oxide or zinc oxide, which are both transparent. These layers provide charge injection and are chemically stable, but may result in EL performance that is somewhat lower than the use of $SrTiO_3$ or $BaTiO_3$. An advantage to the use of the conducting, transparent oxide layer is the elimination of one layer in the EL laminate. The dielectric layer 20 and the conducting electrode 22 are chosen to form a self-healing structure. FIG. 4 shows a modified laminate structure at 60 which is similar to the TFEL structure in FIG. 1b in which the oxide phosphor is located on an indium tin oxide (ITO) layer. The performance of the TFEL device of FIG. 4 is illustrated in FIG. 5. AC pulses were applied to the device at a frequency of 60 Hz. The threshold voltage is 200 volts, and a brightness of 50 fL is achieved at 240 volts. The maximum efficiency is 0.4 L/W.

The non-limiting exemplary results shown in FIGS. 2 to 4 were obtained using the electroluminescent green phosphor $Zn_2Si_xGe_{1-x}O_4$:Mn, wherein $0 \leq x < 1$ with a preferred value of x being about 0.5. Mn is preferably present in the range from about 1% to 4% mole. A specific example of a green phosphor has the formula $Zn_{1.96}Mn_{0.04}Si_{0.5}Ge_{0.5}O_4$. The presence of germanium in the zinc germanates produces a very efficient green electroluminescent phosphor and has the effect of lowering the processing temperatures to well below a thousand degrees as disclosed in U.S. Pat. Nos. 5,725,801, 5,788,882 and 5,897,812 which are each incorporated herein by reference in their entirety.

These patents also disclose highly efficient oxide based red emitting phosphors, discussed hereinafter, which may also be incorporated into the TFEL devices disclosed herein (data not shown). The red phosphors that may be used in the present TFEL laminates may include $Ga_2O_3$:Eu with Eu spanning the range in which said rare earth is soluble in $Ga_2O_3$ and is preferably in a range from about 0.1% to about 12%. Another EL oxide that may be used is $Ca_{1-x}Eu_xGa_yO_z$, where x is in the range from about 0.001 to about 0.1, y is in a range from about 0.5 to about 4, and z is approximately equal to $1+(3/2)y$.

Another electroluminescent red emitting phosphor that may be used has a formulation given by $Sr_{1-x}Eu_xGa_yO_z$, where x is in the range 0.001 to 0.1, y is from about 0.5 to about 12, and z is approximately $1+(3/2)y$.

Another electroluminescent red emitting phosphor film that may be used has a formulation given by $Ba_{1-x}Eu_xGa_yO_z$, where x is in the range from about 0.001 to about 0.1, y is from about 0.5 to about 4, and z is approximately $1+(3/2)y$.

A red emitting phosphor oxide compound having a formula $Sr_3Ga_2O_6$:n%Eu, wherein n% is the mole percent of Eu present in $Sr_3Ga_2O_6$ and spans the range in which Eu is soluble in $Sr_3Ga_2O_6$ may be used. Another red emitting phosphor that may be used includes the compound having a formula $Sr_4Ga_2O_7$:n%Eu, wherein n% is the mole percent of Eu present in $Sr_4Ga_2O_7$ and spans the range in which Eu is soluble in $Sr_4Ga_2O_7$. Another red emitting phosphor compound that may be used has a formula $Sr_7Ga_4O_{13}$:n%Eu, wherein n% is the mole percent of Eu present in $Sr_7Ga_4O_{13}$ and spans the range in which Eu is soluble in $Sr_7Ga_4O_{13}$.

Another electroluminescent red phosphor that may be used is $SrGa_2O_4$:n%RE wherein RE is a rare earth dopant selected from the group consisting of Eu, Tb and combinations thereof, n% is the mole percent of RE present in $SrGa_2O_4$ and spans the range in which the rare earths are soluble in $SrGa_2O_4$, Other red emitting compounds that may be used include a compound having a formula $SrGa_4O_7$:n%Eu, wherein n% is the mole percent of Eu present in $Sr_4Ga_2O_7$ and spans the range in which Eu is soluble in $Sr_4Ga_2O_7$; a compound having a formula $SrGa_{12}O_{19}$:n%Eu, wherein n% is the mole percent of Eu present in $SrGa_{12}O_{19}$ and spans the range in which Eu is soluble in $SrGa_{12}O_{19}$; a compound having a formula $Sr_3Ga_4O_9$:n%Eu, wherein n% is the mole percent of Eu present in $Sr_3Ga_4O_9$ and spans the range in which Eu is soluble in $Sr_3Ga_4O_9$; a compound having a formula $Ba_3Ga_2O_6$:n%Eu, wherein n% is the mole percent of Eu present in $Ba_3Ga_2O_6$, and spans the range in which Eu is soluble in $Ba_3Ga_2O_6$; a compound having a formula $Ba_4Ga_2O_7$:n%Eu, wherein n% is the mole percent of Eu present in $Ba_4Ga_2O_7$, and spans the range in which Eu is soluble in $Ba_4Ga_2O_7$.

Another red emitting electroluminescent oxide phosphor that may be used in the present laminate includes the electroluminescent phosphor having a formula $BaGa_2O_4$:n%RE, wherein RE is a rare earth dopant selected from the group consisting of Eu, Tb, and combinations thereof, n% is the mole percent of RE present in $BaGa_2O_4$ and spans the range in which said rare earths are soluble in $BaGa_2O_4$.

These oxide phosphors are highly advantageous because, as disclosed in these patents, they have demonstrated high luminance output and extended life. Further, being oxides, they do not react with atmospheric water vapor and oxygen and so minimal sealing is required in manufacturing the display.

Other oxide phosphors may also be employed, such as those containing other rare earth dopants which emit light of other colours such as Tb, Dy, Tm or transition metal dopants such as Ti and Cr. Since the achievement of a full range of colours is important for EL devices, the range of EL oxide phosphors that may be employed in the current laminate is not to be restricted.

It will be understood that the thickness in the Figures are not meant to be limiting but serve to exemplify how the present EL devices may be made using all thin films which is a major advantage of the present invention.

The inventors have shown for the first time that bright red and green oxide phosphors may be incorporated in TFEL device structures using much thinner dielectric layers in the thickness range from submicrons to several microns. Those skilled in the art will appreciate that the TFEL structures comprising the conducting electrode layers, phosphors and dielectrics may be deposited in a variety of methods that are well known in the TFEL literature as applied to sulfide phosphors, see for example Y. Ono, "Electroluminescent Displays", World Scientific, 1995, Singapore. A range of substrates may also be used including glass, fused silica, ceramic glass and glazed or polished ceramic. In addition, those skilled in the art will understand that there are many alternative dielectric materials that may be used, for example, high K dielectrics such as $BaTiO_3$, or low K dielectrics such as $Ta_2O_5$, $Y_2O_3$, aluminum titanate, silicon oxy-nitride and silicon aluminum oxy-nitride. A partial list of dielectrics which may be used in the devices disclosed herein is found in Ono.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An electroluminescent laminate, comprising;
   an electrically insulating substrate;
   a conducting metal oxide layer on a surface of the substrate;
   an electroluminescent oxide phosphor layer on the conducting layer;
   a first dielectric interface layer on the oxide phosphor layer;
   a first dielectric layer on the first dielectric interface layer, the first dielectric interface layer having a dielectric constant higher than a dielectric constant of the first dielectric layer; and
   a second conducting layer on the first dielectric layer, and wherein at least one of the second conducting layer and the conducting metal oxide layer is substantially transparent, and wherein when only said conducting metal oxide layer is substantially transparent said substrate is also transparent.

2. The electroluminescent laminate according to claim 1 wherein said first dielectric layer and said second conducting layer are characterized by self-healing properties.

3. The electroluminescent laminate according to claim 2 wherein the conducting metal oxide is selected from the group consisting of zinc oxide and indium tin oxide.

4. The electroluminescent laminate according to claim 2 wherein said oxide phosphor layer has a thickness in a range of about 0.2 $\mu$m to about 1.5 $\mu$m.

5. The electroluminescent laminate according to claim 2 wherein said first dielectric interface layer has a thickness in a range of about 0.01 $\mu$m to about 1.5 $\mu$m.

6. The electroluminescent laminate according to claim 2 wherein said first dielectric layer has a thickness in a range of about 0.05 $\mu$m to about 2.0 $\mu$m.

7. The electroluminescent laminate according to claim 6 wherein said first dielectric layer has a relative dielectric constants in a range from about 3 to about 60.

8. The electroluminescent laminate according to claim 7 wherein said first dielectric layer includes an oxide selected from the group consisting of $SiO_2$, $Si_3N_4$, $Al_2O_3$, $Ta_2O_5$, silicon oxy-nitride and silicon aluminum oxy-nitride.

9. The electroluminescent laminate according to claim 1 wherein said first dielectric interface layer has a relative dielectric constant in a range from about 100 to about 10,000.

10. The electroluminescent laminate according to claim 9 wherein said first dielectric interface layer is crystalline with a perovskite structure.

11. The electroluminescent laminate according to claim 9 wherein said first dielectric interface layer includes an oxide selected from the group consisting of $SrTiO_3$, $BaTiO_3$, and $Sr_{1-x}Ba_xTiO_3$, wherein $0<x<1$.

12. The electroluminescent laminate according to claim 1 including a second dielectric interface layer between the conducting metal oxide layer and the oxide phosphor layer.

13. The electroluminescent laminate according to claim 12 wherein said second dielectric interface layer has a thickness in a range of about 0.01 $\mu$m to about 1.5 $\mu$m.

14. The electroluminescent laminate according to claim 12 including a second dielectric layer between the conducting metal oxide layer and said second dielectric interface layer.

15. The electroluminescent laminate according to claim 14 wherein said second dielectric layer has a thickness in a range of about 0.05 $\mu$m to about 2.0 $\mu$m.

16. An electroluminescent laminate, comprising;
   an electrically insulating substrate;
   a first conducting layer on a surface of the substrate;
   a first dielectric interface layer on the first conducting layer;
   an oxide phosphor layer on the first dielectric interface layer;
   a second dielectric interface layer on the oxide phosphor layer;
   a first dielectric layer on the second dielectric interface layer;
   the first and second dielectric interface layers each having a dielectric constant greater than a dielectric constant of the first dielectric layer; and a second conducting layer on the first dielectric layer, and wherein at least one of the two conducting layers is substantially transparent, and wherein when only said first conducting layer is substantially transparent said substrate is also transparent.

17. The electroluminescent laminate according to claim 16 wherein said first dielectric layer and said second conducting layer are characterized by self-healing properties.

18. The electroluminescent laminate according to claim 17 wherein at least one conducting layer is a substantially transparent conducting metal oxide selected from the group consisting of zinc oxide and indium tin oxide.

19. The electroluminescent laminate according to claim 17 including a second dielectric layer between the first conducting layer and the first dielectric interface layer.

20. The electroluminescent laminate according to claim 17 wherein said oxide phosphor layer has a thickness in a range of about 0.2 $\mu$m to about 1.5 $\mu$m.

21. The electroluminescent laminate according to claim 17 wherein said first dielectric interface layer has a thickness in a range of about 0.01 $\mu$m to about 1.5 $\mu$m.

22. The electroluminescent laminate according to claim 17 wherein said second dielectric interface layer has a thickness in a range of about 0.01 $\mu$m to about 1.5 $\mu$m.

23. The electroluminescent laminate according to claim 17 wherein said first dielectric layer has a thickness in a range of about 0.05 $\mu$m to about 2.0 $\mu$m.

24. The electroluminescent laminate according to claim 19 wherein said second dielectric layer has a thickness in a range of about 0.01 $\mu$m to about 2.0 $\mu$m.

25. The electroluminescent laminate according to claim 19 wherein said first and second dielectric layers have relative dielectric constants in a range from about 3 to 60.

26. The electroluminescent laminate according to claim 25 wherein said first and second dielectric layers comprise an oxide selected from the group consisting of $SiO_2$, $Si_3N_4$, $Al_2O_3$, $Ta_2O_5$, silicon oxy-nitride, and silicon aluminum oxy-nitride.

27. The electroluminescent laminate according to claim 17 wherein said first and second dielectric interface layers have relative dielectric constants in a range from about 100 to about 10,000.

28. The electroluminescent laminate according to claim 27 wherein said first and second dielectric interface layers are crystalline with a perovskite structure.

29. The electroluminescent laminate according to claim 28 wherein said first and second dielectric interface layers comprise an oxide selected from the group consisting of $SrTiO_3$, $BaTiO_3$, and $Sr_{1-x}Ba_xTiO_3$, wherein $0<x<1$.

30. The electroluminescent laminate according to claim 1 wherein said electroluminescent oxide phosphor is $Zn_{1.96}Mn_{0.04}Si_{0.5}Ge_{0.5}O_4$.

31. The electroluminescent laminate according to claim 16 wherein said electroluminescent oxide phosphor is $Zn_{1.96}Mn_{0.04}Si_{0.5}Ge_{0.5}O_4$.

32. The electroluminescent laminate according to claim 1 wherein said electroluminescent oxide phosphor is $Ga_2O_3$:Eu with the Eu having a concentration selected from a range in which Eu is soluble in $Ga_2O_3$.

33. The electroluminescent laminate according to claim 16 wherein said electroluminescent oxide phosphor is $Ga_2O_3$:Eu having a concentration selected from a range in which Eu is soluble in $Ga_2O_3$.

34. The electroluminescent laminate according to claim 1 wherein said electroluminescent oxide phosphor is $Ca_{1-x}Eu_xGa_yO_z$, where x is in the range from about 0.001 to about 0.1, y is in a range from about 0.5 to about 4, and z is approximately equal to 1+(3/2)y.

35. The electroluminescent laminate according to claim 16 wherein said electroluminescent oxide phosphor is $Ca_{1-x}Eu_xGa_yO_z$, where x is in the range from about 0.001 to about 0.1, y is in a range from about 0.5 to about 4, and z is approximately equal to 1+(3/2)y.

36. The electroluminescent laminate according to claim 1 wherein said electroluminescent oxide phosphor is $Sr_{1-x}Eu_xGa_yO_z$, where x is in the range 0.001 to 0.1, y is from about 0.5 to about 12, and z is approximately 1+(3/2)y.

37. The electroluminescent laminate according to claim 16 wherein said electroluminescent oxide phosphor is $Sr_{1-x}Eu_xGa_yO_z$, where x is in the range 0.001 to 0.1, y is from about 0.5 to about 12, and z is approximately 1+(3/2)y.

38. The electroluminescent laminate according to claim 1 wherein said electroluminescent oxide phosphor is $Ba_{1-x}Eu_xGa_yO_z$, where x is in the range from about 0.001 to about 0.1, y is from about 0.5 to about 4, and z is approximately 1+(3/2)y.

39. The electroluminescent laminate according to claim 16 wherein said electroluminescent oxide phosphor is $Ba_{1-x}Eu_xGa_yO_z$, where x is in the range from about 0.001 to about 0.1, y is from about 0.5 to about 4, and z is approximately 1+(3/2)y.

* * * * *